United States Patent [19]

Salvadorini

[11] Patent Number: 4,931,855
[45] Date of Patent: Jun. 5, 1990

[54] METHOD FOR GENERATING AND TRANSMITTING HIGH-DEFINITION COLOR TELEVISION SIGNALS, COMPATIBLE WITH CURRENT STANDARDS AND PROCESS AND APPARATUS FOR RECEIVING SAID SIGNALS

[75] Inventor: Rolando Salvadorini, Turin, Italy

[73] Assignee: Rai Radiotelevisione Italiana, Turin, Italy

[21] Appl. No.: 215,644

[22] Filed: Jul. 6, 1988

[30] Foreign Application Priority Data

Feb. 18, 1988 [IT] Italy ............................... 19452 A/88

[51] Int. Cl.⁵ .............................................. H04N 9/32
[52] U.S. Cl. .................................... 358/12; 358/142; 358/105; 358/141
[58] Field of Search ................... 358/12, 31, 141, 133, 358/142, 105, 14

[56] References Cited

U.S. PATENT DOCUMENTS

| | | | |
|---|---|---|---|
| 4,628,344 | 12/1986 | Glenn | 358/12 |
| 4,670,783 | 6/1987 | Naden | 358/141 |
| 4,701,783 | 10/1987 | Glenn | 358/31 |
| 4,745,458 | 5/1988 | Hirano et al. | 358/12 |

FOREIGN PATENT DOCUMENTS 0204450 12/1986 European Pat. Off. .

OTHER PUBLICATIONS

"Advance Television Systems" by Hopkins United States Advanced Television Systems Committee, pp. 1–15.

"Research and Development on High-Definition Television in Japan" by Hayashi, SMPTE Journal, Mar. 1981, pp. 179–186.

"NKH Technical Monograph", Technical Research Laboratories of Nippon Hoso Kyokai (Japan Broadcasting Corp.), No. 32, 6/82, pp. 1–101.

"Optimum FIR Digital Filter Implementations for Decimation Interpolation, and Narrow-Band Filtering", by Crochiere, IEEE Transactions on Acoustics, Speech and Signal Processing, vol. ASSP-23, No. 5, 10/75, pp. 444–456.

"HDTV Motion Adaptive Bandwidth Reduction Using DATV", by Storey, BBC Research Department Report, BBC RD 1986/5, 6/86, pp. 1–7.

"A Motion Vector Detector for MUSE Encoder," Ninomiya et al., IEEE, 1986, pp. 1280–1284.

Primary Examiner—Edward L. Coles, Sr.
Assistant Examiner—David E. Harvey
Attorney, Agent, or Firm—R. Neil Sudol; Henry D. Coleman

[57] ABSTRACT

The high-definition RGB television signal is converted on one side into a normal-definition color TV signal according to a chosen current standard (NTSC, PAL or SECAM), and on the other into a high-definition color TV signal slowed to a frame frequency which is a submultiple of the original scanning value, and the two color TV signals are transmitted on two independent earth TV channels or on a satellite channel. In reception, said normal-definition signal is converted into a first TV signal with a scanning frequency matching that of high definition, and said slowed high-definition color signal is converted into a second high-definition signal having its original frequency, and said first converted signal and said second converted signal are applied to a high-definition TV display respectively for the moving portions of the picture and for the fixed portions of the picture.

12 Claims, 2 Drawing Sheets

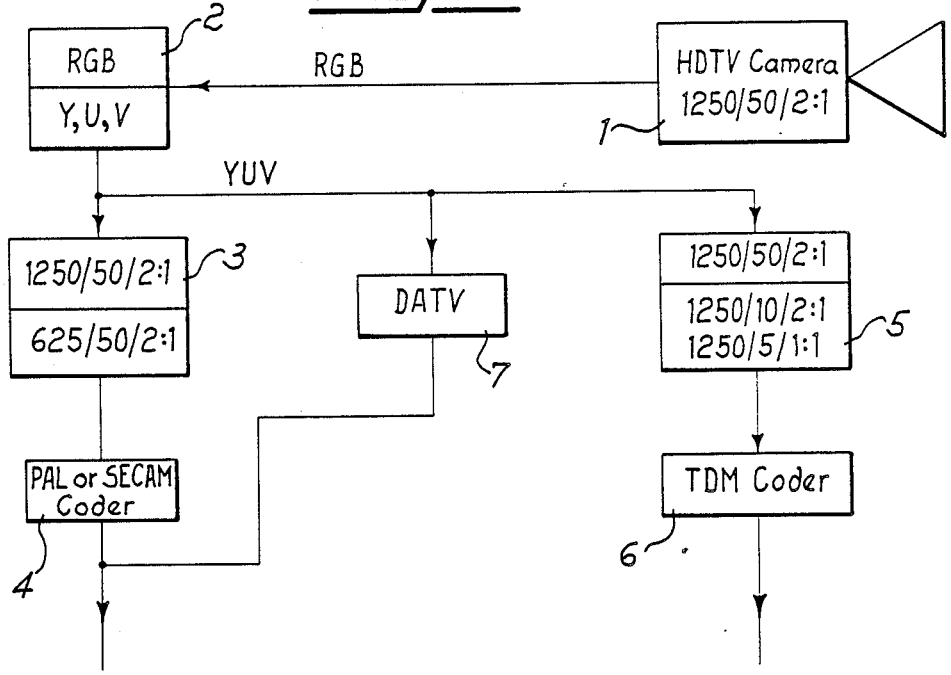
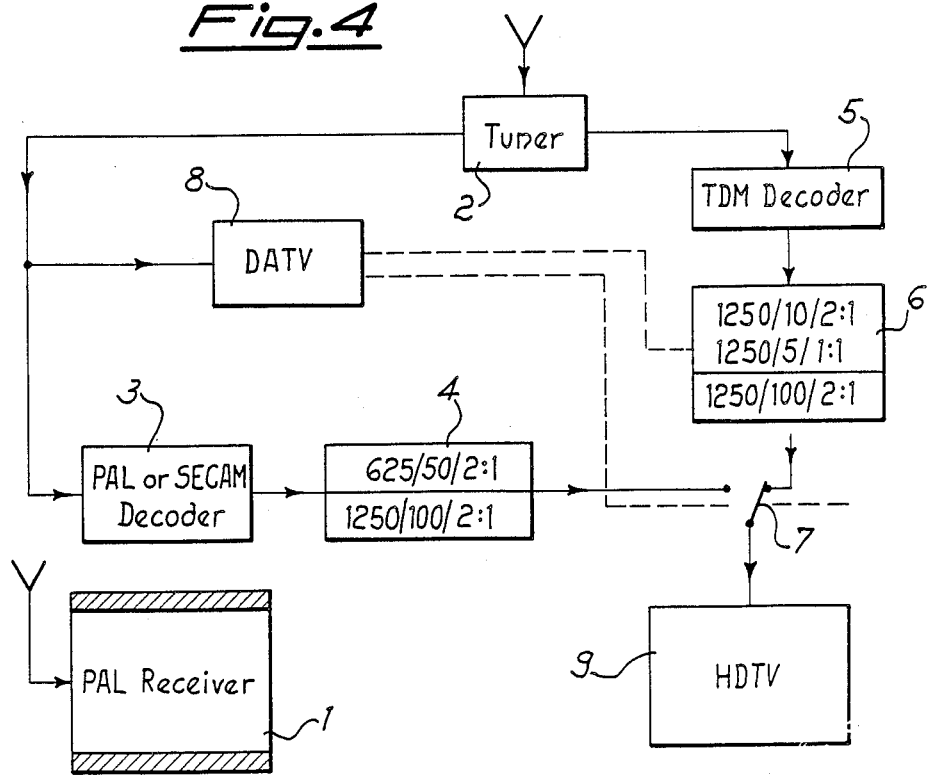

METHOD FOR GENERATING AND TRANSMITTING HIGH-DEFINITION COLOR TELEVISION SIGNALS, COMPATIBLE WITH CURRENT STANDARDS AND PROCESS AND APPARATUS FOR RECEIVING SAID SIGNALS

BACKGROUND OF THE INVENTION

The present invention relates to a method for transmitting high-definition TV (HDTV) signals compatible with the standards currently in use (NTSC, PAL or SECAM), i.e. such as to be receivable and usable by conventional TV sets, even if with normal picture quality. The invention also relates to a process for receiving and using said signals with HDTV quality.

As is known, HDTV systems have been proposed in which the picture is scanned in a number of lines which is approximately twice that of the current standard, e.g. 1250 lines instead of 625 lines per frame according to the European standards, or 1125 lines instead of 525 according to the U.S. standard. Though the high TV definition obtainable with such systems is certainly desirable, their adoption entails two severe disadvantages, i.e. the high frequency bandwidth they occupy and the non-compatibility of the signal with current TV receivers.

To eliminate the first of these disadvantages, picture compression methods, for example the MUSE transmission system developed by the Japanese public television company Nippon Hoso Kyokai, have been proposed. According to this system, only the fixed portions of the picture (i.e. the picture portions which remain unchanged from one frame to the next, such as the background) are transmitted in high definition, while the moving portions of the picture, for which the human eye perceives a lower definition, are transmitted with reduced definition. Motion vectors, indicating the movements of the entire picture, are also transmitted together with the signal (see Hayaski K., "Research and Development on High-Definition Television in Japan", *SMPTE Journal*, March 1981, or NHK—Technical Monograph No. 3: "High-Definition Television", Nippon Hoso Kyokai—Technical Research Laboratories, June 1982).

HDTV, even in its various versions, such as the abovementioned MUSE system, still has the disadvantage of non-compatibility, i.e. of the impossibility of receiving HDTV programs with an ordinary TV receiver, not even with a low-quality picture, due to the difference in transmission standards.

Besides the difference in the number of scanning lines, it should be noted that the aspect ratio of the picture is also different in the HDTV system, being set to 16/9 in the new system as opposed to 4/3 in conventional standards (NTSC, PAL or SECAM).

SUMMARY OF THE INVENTION

To overcome the above described disadvantages of the prior art, the aim of the present invention is therefore to provide a method for generating and transmitting compatible HDTV signals, i.e. signals which can be received by ordinary TV receivers according to one of said current standards, which however also contain HDTV information so that they can be received and converted into HDTV pictures by appropriately designed and equipped TV receivers.

An object of the invention is to provide a method and an apparatus for receiving said compatible signals and for converting them into HDTV pictures.

The invention achieves the above described aim and objects, as well as others which will become apparent hereinafter, with a method for generating and transmitting color HDTV signals compatible with current standards (NTSC, PAL or SECAM), wherein the high-definition RGB signal is converted on one side into a normal-definition color TV signal according to a chosen current standard, and on the other into a color HDTV signal slowed to a frame frequency which is a submultiple of the original scanning frequency, and the two color TV signals are transmitted on two independent earth TV channels or in an associated manner on a satellite channel.

The invention furthermore comprises a method for receiving and displaying color HDTV signals generated and transmitted according to the abovementioned generation and transmission process, characterized in that each of said respectively normal-definition and slowed high-definition color TV signals is received individually and in that on one side said normal-definition signal is demodulated and converted into a first TV signal with a scanning frequency which corresponds to that of high definition and on the other side said slowed high-definition color signal is decoded and converted into a second high-definition signal having its original frequency, said first converted signal and said second converted signal being applied to a high-definition TV display respectively for the moving portions of the picture and for the fixed portions of the picture.

The concept of the invention resides in transmitting a signal according to the current NTSC, PAL or SECAM standard (hereinafter termed "normal-definition signal") on a conventional TV channel and in transmitting a full-definition signal at slowed speed, thus reducing the bandwidth of the frequencies involved, on another conventional independent TV channel (or both are transmitted on a satellite channel, one as subcarrier of the other). In reception, the conventional TV set receives and uses only the normal-definition signal, while the HDTV receiver, as described hereinafter, also receives the slowed HDTV signal and combines the two signals so as to reproduce the HDTV signal for the fixed portions of the picture and the normal-definition signal for its moving portions.

A digital signal, containing information on which portions of the picture are fixed and which move, is preferably inserted in the normal-definition signal as described hereinafter, to control the HDTV receiver in using the two received TV signals.

The difference in the aspect ratios of the picture in the current system and in the high-definition one is preferably solved, according to the invention, by adding a black band at the top and one at the bottom in the picture transmitted on the normal-definition channel, so as to restore the 4/3 ratio. Such bands are ignored by the HDTV receiver.

BRIEF DESCRIPTION OF THE DRAWINGS

The invention is now described in greater detail in some preferred embodiments, illustrated in the accompanying drawings, wherein:

FIG. 3 is a block diagram of a system for generating and transmitting HDTV signals compatible with the European standard, according to another preferred embodiment of the invention;

FIG. 4 is a block diagram of an apparatus for receiving compatible signals generated according to the concepts of the invention, for the European standard.

DESCRIPTION OF THE PREFERRED EMBODIMENTS

U.S. System

The invention is first described as applied to the U.S. standard with 60-Hz field frequency, 525 lines, and scanning interlacing, abbreviated as 525/60/2:1. For the HDTV system, reference is made to the Japanese 1125/60/2:1 system, though the invention may be even more easily applied to a possible U.S. 1050/60/2:1 system.

Figure 1:
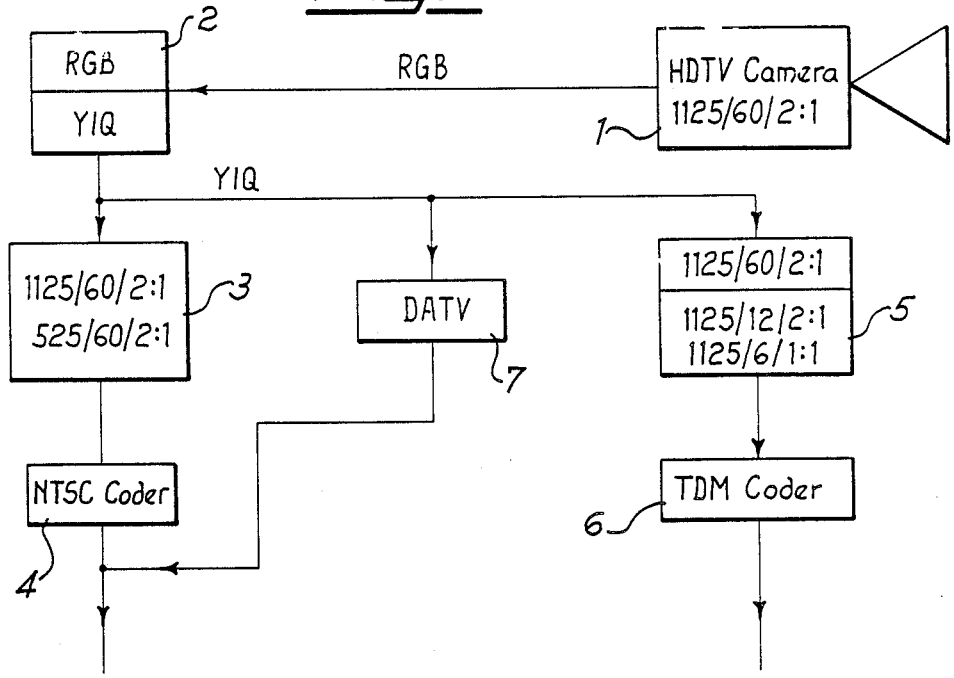
FIG. 1 is a block diagram of a system for generating and transmitting HDTV signals compatible with the U.S. standard, according to a preferred embodiment of the invention.

With reference to FIG. 1, a high-definition TV camera 1 generates, in a per se known manner, an RGB signal of the 1125/60/2:1 type. This signal is converted by a converter 2, in a known manner, into a YIQ luminance and chrominance signal, which is stored on one side in a first frame memory 3 and on the other in a second frame memory 5.

The signal is read from the first frame memory 3 with a 525/60/2 1 scan and is sent to an NTSC encoder 4 to be transmitted on an ordinary 4-Mhz TV channel. However, to change the aspect ratio of the picture from 16/9 to 4/3, the memory is read after 30 informationless lines, and 30 more informationless lines are added after the readout of each field.

More precisely, the active lines for each field in the 525/60/2:1 system are normally 525/2 − 20, therefore approximately 242. According to the invention, the active lines become 9/12 of 242, i.e. 182 active lines. The remaining 60 lines remain informationless and appear as 30 top black lines and 30 bottom black lines.

Said 182 active lines must read the 542 HDTV active lines (1125/2 − 20) at each field. An interpolation and a vertical filtering are therefore necessary, the methods for their execution not being described herein as they are available in the literature (e.g. *IEEE Transactions on Acoustics*, vol. ASSP-23, No. 5, October 1975: "Optimum FIR Digital Filter Implementation for Decimation, Interpolation and Narrow-Band Filtering", by Ronald E. Crochiere and Lawrence R. Rabiner).

The signal is read from the second memory 5 at reduced speed, preferably at a frequency five times lower than the original scanning value of the TV camera, thus obtaining a 1125/12/2:1 signal, i.e. formed by 12 fields per second instead of 60. In other words, 5 field periods are required for the transmission of a slowed field.

Alternatively, the readout of the second memory 5 may be performed by progressive scanning, i.e. by reading all the lines in progression rather than with interlacing, at 6 times per second, therefore reading 6 complete frames per second, and thus generating a 1125/6/1:1 signal.

In any case the bandwidth is reduced by the same ratio, which is 5 in the example, and the slowed luminance signal occupies a band of only 4 MHz (like a conventional TV channel) instead of the 20 MHz normally required by HDTV. The two chrominance signals I and Q are subject to the same treatment as the luminance signal by means of two further frame memories fully similar to the preceding one but with less capacity in relation to the smaller bandwidth (7.2 MHz instead of 20 MHz). The I and Q signals thus have a band of 7.2/5 MHz=1.44 MHz.

Alternatively, the writing of the memory 5 can be performed intermittently instead of continuously: i.e. the two fields of the picture are written, then there is a wait state lasting for a complete slowed readout (5 frames) and then the writing resumes.

The signal thus obtained may, in principle, be transmitted with the same NTSC system used for the compatible system. However, according to the invention, in order to reduce the mutual interference between the luminance and chrominance signals, and to also achieve a better signal/noise ratio on the chrominance, the signal is sent to an encoder 6 for the time-division transmission (TDM) of the three components of luminance (Y) and chrominance (I and Q). These three components are compressed in the line time and their complementary expansion is performed during reception, as is known from the literature.

This full-definition signal may not have synchronisms, or blanking times, since the synchronisms, as will become apparent hereinafter, are obtained from the compatible channel. Accordingly nearly all the time may be active, with great advantages in transmission efficiency.

Bearing in mind that the active line time is normally 85% of the entire line time, by using a compression ratio of 3 for the chrominance signal, with alternated line-by-line transmission of the two components I and Q, the time occupied for transmission is 85/3=28% of the line time. The frequency band of the chrominance becomes $3 \times 1.44$ *MHz*=4.32 *MHz*.

Using a compression ratio of 1.2 for the luminance signal, the time occupied for transmission becomes 85/1.2=71% of the line time. The frequency band of the luminance in transmission becomes $1.2 \times 4$ *MHz*=4.8 *MHz*. Approximately 1% of the line time is still available for the transitions among the various signals.

The original YIQ signal is furthermore processed in a circuital device 7, wherein a digital signal is generated which defines the moving portions of the picture and the fixed ones. This signal is obtained according to the Japanese "motion vector" method used in MUSE or according to the DATV one developed by the BBC (see *BBC Report RD* 1986/5 "HDTV Motion adaptive bandwidth reduction using DATV", by R. Storey, June 1986). The picture is split into multiple portions or pixel groups for each whereof, if the pixels all have the same motion (uniform motion), a motion vector is provided the parameters whereof (speed and direction) are inserted as data in the frame blanking of the compatible signal.

Since the bandwidth of the DATV signal may exceed the capacity of the frame blanking, according to the invention this signal is also transmitted as blacker than black in the dead lines of the horizontal black bands, i.e. in the region between the level of black and that of the synchronism peaks. The synchronisms are not disturbed, since the DATV signal is only transmitted for a limited time interval (the black bands), and the TV receiver has considerable flywheel.

The bandwidth which can be transmitted in the black bands is 5 MHz, but transmission is carried out only for a portion of the time which is equal to the ratio between the number of black lines (60) and the total of the active lines (182), i.e. for 25% of the time; therefore the resulting band is of only 1.25 MHz (0.25×5). If frame blanking is also employed this band approximately doubles.

The entire band of the slowed full-definition signal can be transmitted on a second normal earth TV channel with vestigial-band amplitude modulation as in normal television, preferably but not necessarily in a channel adjacent to that of the compatible signal. If instead it is desired to transmit the entire information from a satellite in a single normalized U.S. channel with a channel width of 24 MHz, this band is too high, and the slowing ratio must be increased to produce lower frequencies.

In reception, conventional TV receivers receive the compatible signal and process it normally, obtaining a picture that differs from the conventional one only in that it has two black bands at the top and at the bottom.

Figure 2:
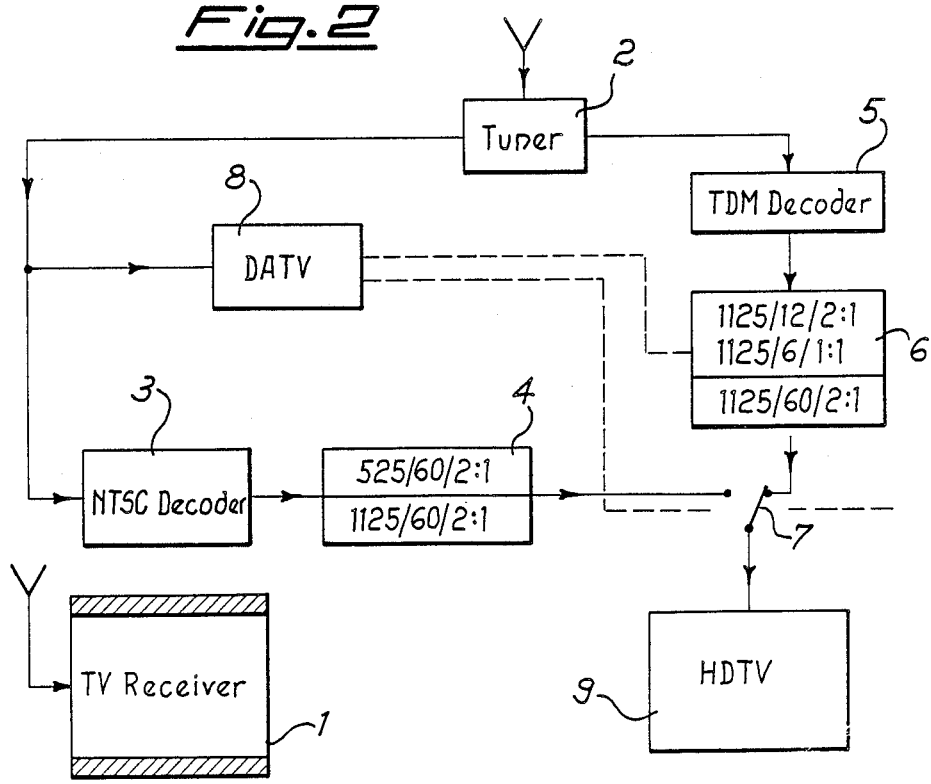
FIG. 2 is a block diagram of an apparatus for receiving compatible signals generated according to the concepts of the invention in the U.S. standard.

The HDTV receiver according to the invention, illustrated in the block diagram of FIG. 2, comprises instead an HDTV tuner 2, which receives both signals, the compatible one and the slowed HDTV one, and applies the compatible signal to an NTSC decoder 3, while it applies the slowed signal to a TDM decoder 5. The compatible signal is also sent to a DATV device 8 which extracts therefrom the digital DATV signal inserted in the transmission.

The NTSC decoder 3 generates a 525/60/2:1 signal and sends it to a frame memory 4 which converts it according to 1125/60/2:1 scanning.

The slowed HDTV signal, after decoding in the TDM decoder, is sent to the frame memory 6, which restores the frame scanning to its original value, thus also producing a 1125/60/2:1 signal.

The frame memories 4 and 6 contain not only the luminance signal Y, but also the memories for the chrominance signals I and Q, which are similar but have lower capacity than the luminance one, as already described for transmission.

The output signals of the two memories 4 and 6 are applied to a three-way switch 7 for the Y, I and Q components, controlled by the switching signal generated by the DATV circuit, to send the fixed portions of the picture from the slowed HDTV channel and the moving portions from the compatible channel to an HDTV display 9, according to the parameters calculated during transmission. The switch 7 is fully similar to the one used in the MUSE system. The display, having a 16/9 aspect ratio, also comprises, in a manner which is evident to the expert in the field, a YIQ-to-RGB conversion matrix.

The DATV signal also drives the memory 6, to move the readout region, for the portions of the picture which move at uniform speed, according to the speed and direction of the motion vector for the affected picture portion, as described above. This method allows to employ the slowed HDTV channel not only for the fixed portions of the picture but also for its uniformly moving portions. It is described in the literature, and its detailed description is omitted herein.

European System

For the European system the transmission system is substantially similar to the one for the U.S. system, except for the different frequency and the different number of scanning lines involved, respectively 625/50/2:1 for the compatible signal and 1250/50/2:1 for the HDTV signal.

With reference to FIG. 3, the RGB signal is converted into a YUV signal, and the conversion from 1250/50/2:1 to 625/50/2:1 is executed on one side to be then sent to PAL or SECAM encoding; on the other side its is slowed 5 times, passing from 1250/50/2:1 to 1250/10/2:1, to be then sent to TDM coding (here, too, conversion to 1250/5/1:1 can instead be executed). The two black bands (as can be easily calculated) must have, here, 35 lines each per each field. The DATV signal is generated in an identical manner and inserted on the PAL or SECAM compatible signal.

Transmission can be performed on two normal earth channels or from a satellite. In the case of satellite transmission on a single European normalized 27-MHz channel, the two signals, the compatible one and the slowed HDTV one, may be side by side, one becoming the subcarrier of the other. A power decrease is probable to avoid intermodulation between the signals.

In reception one proceeds as in the U.S. system, but the vertical scanning frequency is preferably doubled from 50 to 100 Hz to reduce flickering. This is not necessary in the U.S. system, where flickering is much less noticeable.

Various variations can be applied to the described processes. For example the DATV signal may, in principle, be formed inside the receiver, by comparing successive frames, instead of being supplied by the transmitter. The adaptation of the picture from the 16/9 ratio to the 4/3 one may be furthermore performed, instead of by adding black bands to the picture, by truncating the lateral portions of the original picture, and transmitting the lateral portions in the second time-division channel with the slowed HDTV signal.

These and other variations of the above described teachings, which are obvious to the expert in the field, are in any case to be considered within the scope of the inventive concept.

I claim:

1. A method for producing a composite high-definition color TV signal compatible with a current standard of (a) a predetermined number of horizontal lines per screen, (b) a pre-established number of fields per second, and (c) a preselected ratio of screen length to screen height, starting from a primary high-definition color TV signal including luminance and color information for a number of horizontal lines substantially greater than the predetermined number of horizontal lines of the current standard, said primary high-definition color signal having a field frequency equal to the pre-established number of fields per second of the current standard, said primary high-definition color TV signal having a ratio of screen length to screen height which is larger than the preselected ratio of screen length to screen height of the current standard, said primary high-definition color TV signal contains luminance and color information for a TV picture image having at least one area of uniform movement, said method comprising the steps of:

converting said primary high-definition color TV signal into a first secondary color TV signal having the predetermined number of horizontal lines per screen, the pre-established number of fields per second, and the preselected ratio of screen length to screen height of the current standard, said step of converting said primary high-definition color TV signal into said first secondary color TV signal including the step of inserting a plurality of informationless lines into said first secondary color TV signal to produce, in a picture on a current-standard TV receiving said first secondary color TV signal, a black band, whereby said picture has the screen length to screen height ratio of said primary high-definition color TV signal;

converting said primary high-definition color TV signal into a second secondary color TV signal corresponding to the same number of horizontal lines as said primary high-definition color TV signal and having a field frequency which is a submultiple of the pre-established number of fields per second of the current standard;

transmitting said first secondary color Tv signal and said second secondary color TV signal as the composite high-definition color TV signal on two separate TV channels;

generating an auxiliary digital signal encoding motion vectors specifying said area of uniform movement; and inserting said auxiliary digital signal in signal regions of said first secondary color TV signal corresponding to said black band.

2. The method according to claim 1, wherein said second secondary color TV signal has a field frequency which is one fifth of the pre-established number of fields per second of the current standard.

3. The method according to claim 1, wherein said second secondary color TV signal has three components encoding luminance and color information for a TV picture image, further comprising the step of time-division multiplexing said three components prior to transmission of said second secondary color TV signal.

4. The method according to claim 1, wherein said second secondary color TV signal is transmitted without synchronization signals.

5. The method according to claim 1, wherein the predetermined number of horizontal lines per screen, the pre-established number of fields per second, and the number of fields per frame of the current standard are 525, 60 and 2, respectively, and wherein the number of horizontal lines per screen, the field frequency and the number of fields per frame of said primary high-definition color TV signal are 1125, 60 and 2, respectively.

6. The method according to claim 1, wherein the predetermined number of horizontal lines per screen, the pre-established number of fields per second, and the number of fields per frame of the current standard are 625, 50 and 2, respectively, and wherein the number of horizontal lines per screen, the field frequency and the number of fields per frame of said primary high-definition color TV signal are 1250, 50 and 2, respectively.

7. The method according to claim 1, further comprising the steps of:

receiving said first secondary color TV signal and said second secondary color TV signal;

demodulating the received first secondary color TV signal to produce a first demodulated color TV signal having a field frequency equal to the pre-established number of fields per second of the current standard;

demodulating the received second secondary color TV signal to produce a second demodulated color TV signal having a field frequency equal to the pre-established number of fields per second of the current standard;

utilizing said first demodulated color TV signal to generate portions of a TV picture display moving non-uniformly; and simultaneously utilizing said second demodulated color TV signal to generate portions of said TV picture display moving uniformly.

8. The method according to claim 7 wherein said second demodulated color TV signal is also used to generate portions of said TV picture display which are fixed.

9. An apparatus for producing a high-definition color TV signal compatible with a current standard of (a) a predetermined number of horizontal lines per screen, (b) a pre-established number of fields per second, and (c) a preselected ratio of screen length to screen height, said apparatus comprising:

high-definition camera means for generating a primary high-definition color TV signal including luminance and color information for a number of horizontal lines substantially greater than the predetermined number of horizontal lines of the current standard, said primary high-definition color TV signal having a field frequency equal to the pre-established number of fields per second of the current standard, said primary high-definition color TV signal having a ratio of screen length to screen height which is larger than the preselected ratio of screen length to screen height of the current standard, said primary high-definition color TV signal contains luminance and color information for a TV picture image having at least one area of uniform movement;

first conversion means operatively connected to said camera means for converting said primary high-definition color TV signal into a first secondary color TV signal having the predetermined number of horizontal lines per screen, the pre-established number of fields per second, and the preselected ratio of screen length to screen height of the current standard and for inserting a plurality of informationless lines into said first secondary color TV signal to produce, in a picture on a current-standard TV receiving said first secondary color TV signal, a black band, whereby said picture has the screen length to screen height ratio of said primary high-definition color TV signal;

second conversion means operatively connected to said camera means for converting said primary high-definition color TV signal into a second secondary color TV signal corresponding to the same number of horizontal lines as said primary high-definition color TV signal and having a field frequency which is a submultiple of the pre-established number of fields per second of the current standard;

transmission means operatively connected to said first conversion means and said second conversion means for transmitting said first secondary color TV signal and said second secondary color TV signal as a composite high-definition color TV signal on two separate TV channels;

means for generating an auxiliary digital signal encoding motion vectors specifying said area of uniform movement; and means for inserting said auxiliary digital signal in signal regions of said first secondary color TV signal corresponding to said black band.

10. An apparatus for receiving a composite high-definition color TV signal including a first color TV signal component compatible with a current standard of (a) a predetermined number of horizontal lines per screen, (b) a pre-established number of fields per second, and (c) a preselected ratio of screen length to screen height, said composite high-definition color TV signal further including a second color TV signal component including luminance and color information for a number of horizontal lines substantially greater than the predetermined number of horizontal lines of the current standard and having a field frequency which is a submultiple of the pre-established number of fields per second of the current standard, said apparatus comprising:

first tuning means for receiving the first color TV signal component;

second tuning means for receiving the second color TV signal component;

first decoding means operatively connected to said first tuning means for decoding said first color TV signal upon reception thereof by said first tuning means;

second decoding means operatively connected to said second tuning means for decoding said second color tV signal upon reception thereof by said second tuning means;

first memory means operatively connected to an output of said first decoding means for storing successive fields encoded in said first color TV signal upon decoding thereof by said first decoding means and for providing a first high definition color TV scanning signal encoding picture information included in said first color TV signal component;

memory means operatively connected to an output of said second decoding means for storing successive fields encoded in said second color TV signal upon decoding thereof by said second decoding means and for providing a second high definition color TV scanning signal encoding picture information included in said second color TV signal component;

switching means, operatively connected to said first memory means and said second memory means and having an output connectable to a high definition color television set, for alternately directing said first high definition color TV scanning signal and said second high definition color TV scanning signal to said television set; and control means operatively connected to said switching means for operating said switching means to alternately transmit said first high definition color TV scanning signal and said second high definition color TV scanning signal to said television set, depending on whether a picture area is moving non-uniformly or whether said picture area is fixed or moving uniformly.

11. The apparatus according to claim 10 wherein said first high definition color TV scanning signal and said second high definition color TV scanning signal each include a first signal component encoding luminance information and two second signal components encoding color information.

12. The apparatus according to claim 10 wherein said control means operates said switching means to transmit said second high definition color TV scanning signal when said picture area is static.

* * * * *